(12) United States Patent
Degady et al.

(10) Patent No.: US 6,280,780 B1
(45) Date of Patent: Aug. 28, 2001

(54) METHOD AND APPARATUS FOR CONTINUOUSLY FORMING COATED CENTER-FILLED GUM PRODUCTS

(75) Inventors: Marc Degady, Morris Plains; Miles Van Niekerk, Madison; Thomas J. Kuncewitch, Long Valley, all of NJ (US)

(73) Assignee: Warner-Lambert Company, Morris Plains, NJ (US)

( * ) Notice: Subject to any disclaimer, the term of this patent is extended or adjusted under 35 U.S.C. 154(b) by 0 days.

(21) Appl. No.: 09/645,287

(22) Filed: Aug. 24, 2000

(51) Int. Cl.[7] ................ A23G 3/00; A23P 1/00; B28B 5/00
(52) U.S. Cl. .............. 426/5; 425/104; 425/233; 425/235; 426/512; 426/524
(58) Field of Search ............... 426/3, 4, 5, 512, 426/516, 524, 660, 414, 289; 425/233, 235, 237, 104

(56) References Cited

U.S. PATENT DOCUMENTS

| | | | |
|---|---|---|---|
| 4,975,288 | * 12/1990 | Hager et al. | 426/5 |
| 5,391,387 | * 2/1995 | Peters | 426/5 |
| 5,716,652 | * 2/1998 | Barkalow et al. | 426/5 |

* cited by examiner

Primary Examiner—George C. Yeung

(57) ABSTRACT

A method, system and apparatus for continuously producing coated tablets or pellets of liquid-filled gum material. An extruded rope of liquid-filled gum material is formed, sized, and separated into individual pellets of liquid-filled gum material. A tablet-forming mechanism having pairs of chain mechanisms with open mating die groove members separate the rope of gum material into individual pieces and form it into individual pellets. The open die groove members have curved non-flat configurations such that the die cavities form pellets of liquid-filled gum material with curved non-flat configurations. The formed pellets of gum material are cooled in a cooling mechanism, conditioned at an appropriate low humidity, low temperature environment, and then coated with a hard sugar or sugarless shell.

12 Claims, 2 Drawing Sheets

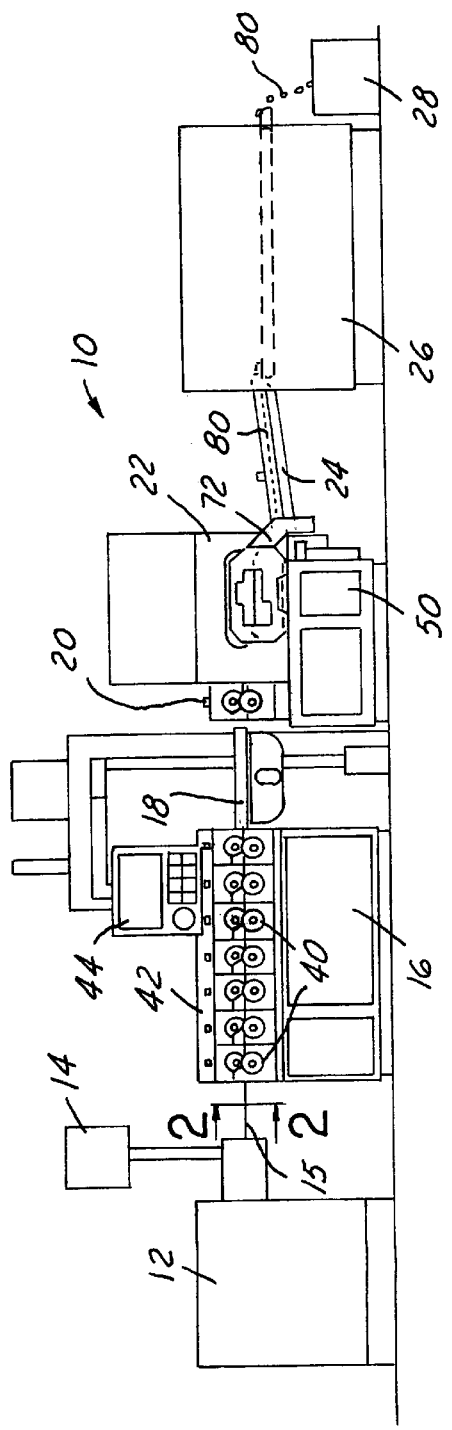
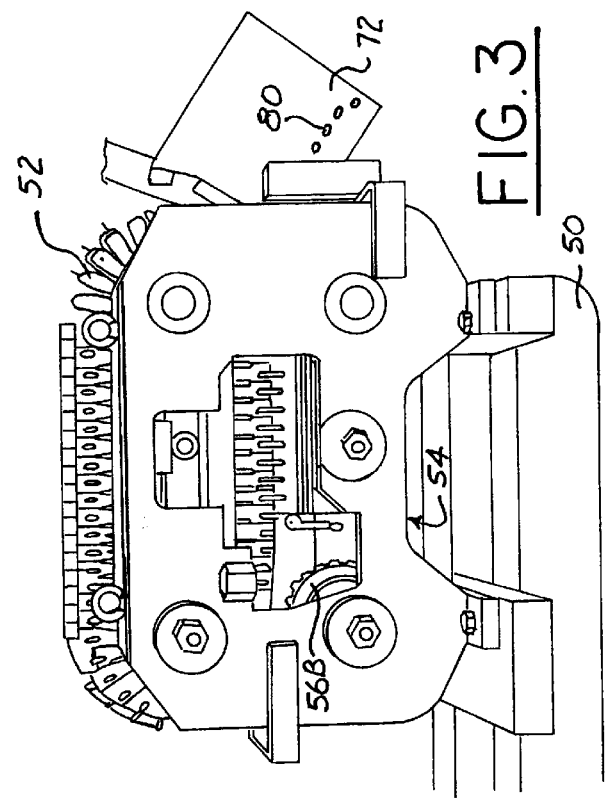
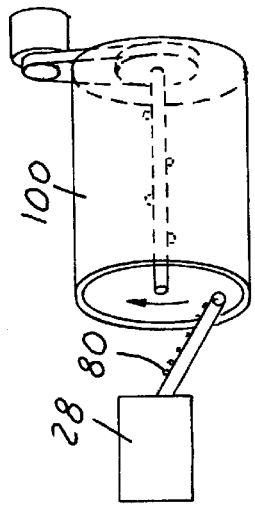
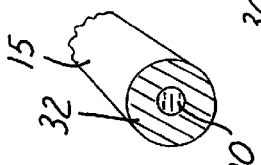
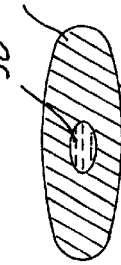
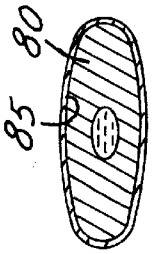

METHOD AND APPARATUS FOR CONTINUOUSLY FORMING COATED CENTER-FILLED GUM PRODUCTS

TECHNICAL FIELD

Method, system and apparatus for forming coated center-filled gum products, particularly for continuously forming individual pieces of liquid-filled gum from a continuous rope or strand which can then be coated with a hard shell material.

BACKGROUND OF THE INVENTION

Liquid or center-filled gum and other confectionery products are in popular demand today. These products have a solid exterior portion and a soft or liquid-type center. The outer portion can be chewing gum or bubble gum of some type, while the liquid center portion can be a flavored material typically having a syrup-like consistency.

There also are products having a chewing gum or bubble gum core with a hard sugar or sugarless shell on the exterior. These products include, for example, Chiclets®, Clorets®, and Dentyne-Ice®. Both liquid-filled and coated gum products are in popular demand and commercially successful today.

There are numerous mechanisms and systems known today for forming liquid-filled gum, coated gum products, and other confectionery products. One of these systems is shown, for example, in U.S. Pat. No. 3,857,963 to Graff et al.

Due to difficulties in manufacturing processes, three-phase gum products having a liquid-filled center portion, a second layer of chewing gum or bubble gum material, and a hard outer shell or coating have not been widely introduced or accepted. Significant problems are present relative to maintaining the liquid-filled center portion intact without leaking and providing commercially acceptable finished surfaces on the final coated products.

One of the problems in particular with coated pellet-type gum products is that they have a tendency to stick together during tumbling and coating creating a large percentage of waste or unacceptable commercial products. Often two or more products join together during the coating process, or products initially joined but later separated still have unsatisfactory surface irregularities.

There is a need for producing three-phase liquid-filled gum products with hard coated shells in a more efficient and commercially acceptable manner.

SUMMARY OF THE INVENTION

It is an object of the present invention to provide an improved method, system and apparatus for producing coated center-filled gum products. It is also an object of the present invention to provide an improved system for continuously producing pieces or pellets of center-filled gum products from a continuous rope or strand of gum material and then covering the pellets with a hard sugar or sugarless coating.

It is a further object of the present invention to provide an improved high speed tablet-forming mechanism which produces pellet-type center-filled gum products which can be coated in a more efficient and commercially satisfactory manner.

These and other objects are met by the unique and inventive gum forming apparatus, system and process in accordance with the present invention. The invention includes an extrusion, sizing, pellet-forming, and coating system which produces coated center-filled pellet-type gum products on a faster, more efficient and less costly basis.

The gum forming system includes an extruder and center-fill system which provides an extruded center-filled rope or strand of chewing gum or bubble gum material. The rope of material is sized in a rope sizer mechanism and then relaxed on a forming table in order to supply a rope having a desired cross-sectional size and shape to a forming mechanism. The sized rope of material is introduced into a high-speed tablet-forming apparatus with two sets of rotating chains. The chains include mating die groove members which together form die cavities of the desired pellet-shape. The dies and resulting pellets have significant curvatures on the upper and lower surfaces.

The formed pieces of liquid-filled gum material are then transported to a cooling tunnel where they are tumbled and cooled to an appropriate temperature for coating. Thereafter, the conditioned pellets are tumbled and coated in a coating tunnel or mechanism which applies a multi-layer hard sugar or sugarless coating on the pellets. The curved surfaces on the pellets prevent them from sticking together in the coating mechanism.

With the present invention, coated liquid-filled pieces of gum material are formed in a faster and more efficient manner.

BRIEF DESCRIPTION OF THE DRAWINGS

FIG. 1 schematically illustrates a continuous center-filled gum forming system in accordance with the present invention;

FIG. 1A depicts a coating system for use as part of the present inventive system and process;

FIGS. 2, 2A and 2B illustrate the gum material and products at various portions during the process;

FIG. 3 illustrates a chain-type pellet-forming mechanism for use with the present invention;

BEST MODE(S) FOR CARRYING OUT THE INVENTION

Figure 4:
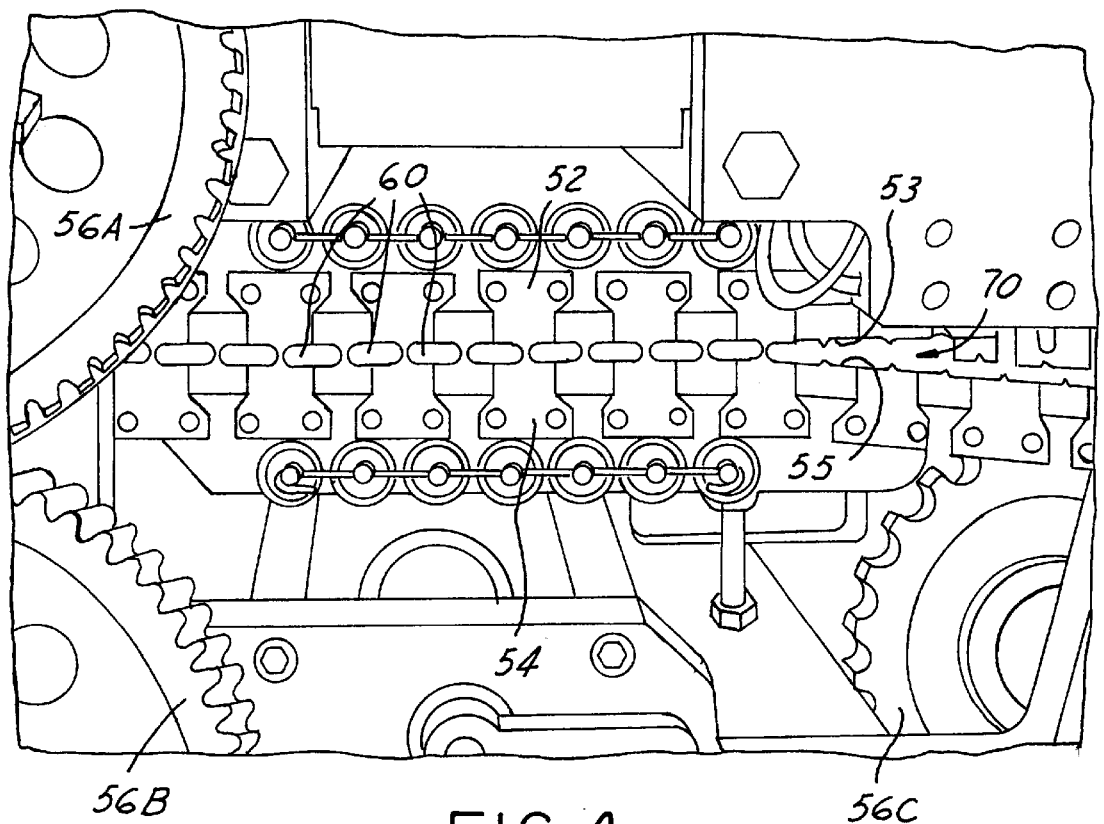
FIG. 4 is an enlarged view of a portion of the chain forming mechanism as shown in FIG. 3.

FIG. 1 is a schematic diagram illustrating the method, system and apparatus in accordance with the present invention. The system shown in FIG. 1 is generally referred to by the reference numeral 10. The system 10 includes an extruder machine 12, a center-filling mechanism 14, a rope sizer mechanism 16, a rope relaxation table 18, an in-feed roller mechanism 20, a pellet or tablet-forming mechanism 22, a conveying mechanism 24, a cooling tunnel or mechanism 26, and a collection container 28.

The extrusion machine 12 can be of any conventional type and includes a liquid filling mechanism 14. The liquid filling mechanism is utilized to insert a stream of liquid material in the center of the gum material 15 as it is being formed and extruded by the extrusion machine. Mechanisms to center-fill gum and other confectionery products are known in the art and no further description is required here.

As shown in FIG. 2, the gum material 15 is extruded in a continuous rope or strand having a generally circular cross-section. The gum material 15 includes an inner core 30 of a liquid or jelly-like material, as well as an outer core 32 of a chewing gum or bubble gum material. In this regard, centers of liquid-filled gum products are flavored and typically have a liquid or syrup-like consistency. The center-filled gum material is formed into individual tablets or pellets 80, as shown in cross-section in FIG. 2A, by the forming mechanism 22. A multi-layer hard shell 85 is subsequently applied to each of the tablets 80, as shown in cross-section in FIG. 2B. The coating is applied in a conventional manner, such as in coating tunnel or mechanism 100 as shown in FIG. 1A.

The rope of gum material 15 is conveyed to the rope sizing mechanism 16 in any standard manner. If the extruder mechanism 12 is positioned immediately adjacent to the rope sizer mechanism, the strand of rope 15 can simply be directly inserted into the forming rollers (as shown). A conventional conveyer mechanism (not shown) could also be utilized.

The rope sizing mechanism 16 includes a series of pairs of pulley-shaped roller members 40. The pairs of roller members 40 are positioned vertically with one roller on top of the other. In the embodiment shown in FIG. 1, seven sets of roller members 40 are provided, although it is understood that a different number of roller members could be provided, as desired. The roller members 40 are positioned on a support member 42 and the speed of the roller members is controlled by a control panel 44.

The roller members 40 "size" the rope or strand of gum material 15 such that it leaves the series of rollers with a certain cross-sectional size and shape which permits entry into the tablet-forming machine and formation of gum pellets of a particular size and weight. In this regard, the series of roller members 40 reduce the diameter or size of the extruded rope of material 15 from a cross-section of several inches in diameter to a cross-section on the order of 1–1½ inches in diameter.

The rope of material is then passed along a relaxation table 18. The table 18 has a series of sensors (not shown) which measure the position of the relaxed rope and adjust the speed of the forming mechanism 22 accordingly. If the sensors indicate that the speed of the rope across the table is too slow such that a significant sag occurs, then the speed of the forming mechanism is increased. On the other hand, if the sensors indicate that the speed of the rope across the table is too fast such that the rope could become stretched, then the speed of the forming mechanism is decreased. The function of the relaxation table 18 is thus to insure that the sized rope of material maintains a consistent and uniform size and diameter. In this manner, consistent and uniformly sized gum tablets in the tablet-forming mechanism will be produced.

The rope of material then is fed into an in-feed roller mechanism 20 which further defines the required cross-sectional size and shape of the rope of material for the formation of tablets or pellets and also helps pull the rope of material and feed it into the die grooves.

The tablet-forming mechanism 22 is positioned on a table member 50 or other supporting structure and includes a pair of rotating chain die members 52 and 54. The chain die members 52 and 54 are endless chain mechanisms and both rotate at the same speed by an appropriate motor and gear mechanism (not shown). In particular, the chain mechanisms 52 and 54 are driven by a plurality of sprocket members 56A, 56B, and 56C, as more particularly shown in FIG. 4.

Each of the chain mechanisms 52 and 54 include a plurality of open curved die groove members 53 and 55, respectively. These are shown in particular in FIGS. 4 and 5. As shown in the drawings, the open die groove members 53 and 55 mate forming die cavities 60 in which the small pieces of gum material (also known as pellets or tablets) are formed.

Figure 5:
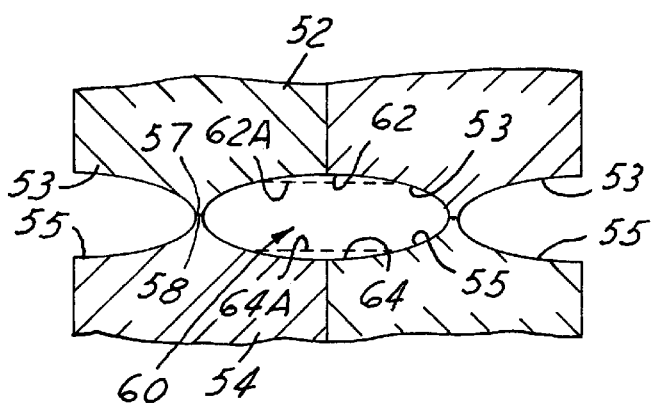
FIG. 5 is an enlarged view of a forming die used with the present invention.

Mating flanges 57 and 58 on the chain mechanisms 52 and 54, respectively, which are positioned between the open die groove members 53 and 55, meet and make contact between each of the die cavities 60. The mating flanges 57 and 58 cut and seal the rope of liquid-filled gum material at those points and form individual pieces of gum material in the die cavity 60. In this regard, as the rope of gum material is inserted into the chain members 52 and 54 as they converge (to the left as shown in FIGS. 3–5), the gum material is formed into individual pieces positioned in the die cavity 60. Thereafter, when the chain mechanisms 52 and 54 diverge, as indicated by reference numeral 70 in FIG. 4, the formed pieces of gum material will follow the lower chain member 54 and fall into chute member 72 and onto conveyer member 24.

The individual tablet pieces of formed liquid-filled gum material 80 are then transported by the conveyer mechanism into the cooling tunnel 26 where they are cooled. The cooled pieces of gum material are then fed into storage container 28 for conditioning and further processing. At this point, the cooled pieces of gum material 80 could also be fed directly into a coating tunnel mechanism, such as rotating tunnel mechanism 100.

Whether the pieces of formed gum material 80 are first stored or transported in a storage container 28 or fed directly into a coating tunnel or mechanism 100, the individual pieces of gum material are subjected to a conventional sugar or sugarless coating process in order to form a hard exterior shell on the liquid-filled gum material. Coating processes or mechanisms of this type are known and do not need any further description here. In general, the coating is applied in numerous thin layers of material in order to form an appropriate uniform coated and finished quality surface on the gum products. The hard coating material, which basically is comprised of sugar, Maltitol, Sorbitol or the like, and flavoring, is sprayed onto the pellets of gum material as they pass through a coating mechanism or a coating tunnel 100 and are tumbled and rotated therein. In addition, warm air is circulated or forced into the coating tunnel or mechanism in order to dry each of the successive coating layers on the formed products.

As shown in FIG. 5, the upper and lower surfaces 62 and 64, respectively, of the cavity 60 have curved configurations. Also, the surfaces 62 and 64 can be continuously curved without any flat or planar portions or areas, or at least with a minimum of flat areas (preferably less than 10% of the total surface area of each surface 62 and 64). This is opposed to flat or uncurved surfaces 62A and 64A of conventional tablet and pellet-forming mechanisms.

Figure 6A:
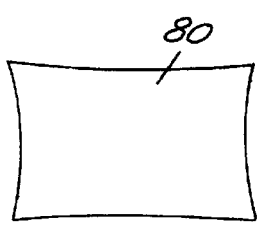
FIGS. 6A, 6B, and 6C illustrate top, side, and end views, respectively, of a center-filled pellet-type gum material product made in accordance with the present invention.
Figure 6C:
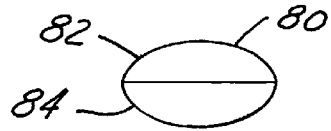
Figure 6B:
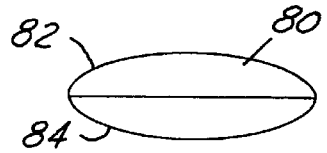

The resulting formed pellet-type gum product 80 is shown in more detail in FIGS. 6A–6C. In this regard, a top or plan elevational view of the tablet 80 is shown in FIG. 6A, a side view in FIG. 6B, and an end view in FIG. 6C. As shown, the upper and lower surfaces 82 and 84, respectively, of the formed center-filled gum product have significantly curved configurations.

The curved configurations of the formed gum products 80 prevent the pellets from sticking together when coated in subsequent operations. The curved or non-flat surfaces 82, 84 which make contact with other non-flat surfaces of adjacent gum products in the coating mechanisms provide very small contact areas preventing the pellets from sticking together.

Typically, the formed gum pellets or tablets 80 are conditioned overnight before they are coated. They are stored in a room having a low humidity of less than 50 percent and at a low temperature of less than 15° C. Once the gum pellets 80 are appropriately conditioned, they are then introduced into a coating mechanism where a multi-layered coating is applied.

With the present invention, a three phase or three-layer product is formed which has a weight less than 2.0 grams. The three layers include a liquid-filled center portion, an inner layer of gum material, and an outer hard candy coating or shell.

While the invention has been described in connection with one or more embodiments, it is to be understood that the specific mechanisms and techniques which have been described are merely illustrative of the principles of the invention. Numerous modifications may be made to the methods and apparatus described without departing from the spirit and scope of the invention as defined by the appended claims.

What is claimed is:

1. A system for continuously producing coated pieces of liquid-filled gum material comprising:

an extruder and center-fill mechanism for continuously producing a rope of center-filled gum material;

a tablet-forming mechanism having a first rotating chain member with a plurality of die groove members thereon and a second chain mechanism having a second plurality of die groove members thereon, said first and second plurality of die groove members being positioned to mate forming die cavities for formation of individual pieces of tablet-type gum material;

a cooling mechanism for cooling the formed pieces of center-filled gum material; and a coating mechanism for applying a hard coating to the formed pieces of gum material;

said die groove members each having surfaces of substantially curved configurations wherein pieces of liquid-filled gum material are formed having curved and non-flat outer configurations.

2. The system as set forth in claim 1 further comprising a rope sizing mechanism positioned between the extrusion mechanism and the tablet-forming mechanism, wherein the extruded rope of liquid-filled gum material is formed and sized into a desired cross-sectional size and shape.

3. The system as set forth in claim 2 further comprising a table member for relaxing said rope of gum material, wherein a consistent cross-sectional size and shape of rope gum material is produced.

4. The system as set forth in claim 1 further comprising an in-feed roller mechanism for feeding the rope of gum material into said tablet-forming mechanism.

5. The system as set forth in claim 1 further comprising a conveyer mechanism for conveying the formed pieces of liquid-filled gum material into said cooling mechanism.

6. A method for continuously producing coated pieces of liquid-filled tablet-type gum material comprising the steps of:

supplying a rope of liquid-filled gum material;

sizing said rope of liquid-filled gum material;

feeding said rope of liquid-filled gum material into a tablet-forming mechanism;

forming individual pieces of liquid-filled gum material from said rope of gum material in said tablet-forming mechanism, said individual pieces of gum material having substantially curved non-flat exterior surfaces;

cooling said formed pieces of gum material; and coating said individual pieces of gum material with a hard coating.

7. The method as set forth in claim 6 wherein said step of sizing said rope of gum material comprises subjecting said rope of gum material to a plurality of sets of vertically-oriented roller members.

8. The method as set forth in claim 6 wherein said step of forming said rope of gum material into individual pieces of gum material includes the step of introducing the rope of gum material between two rotating chain mechanisms, each of the chain mechanisms having open die groove members thereon.

9. The method as set forth in claim 6 further comprising the step of transporting the formed pieces of liquid-filled gum material to a cooling mechanism with a conveyer mechanism.

10. The method as set forth in claim 6 further comprising the step of conditioning the cooled pieces of gum material prior to coating them.

11. An apparatus for continuously producing pieces of liquid-filled gum material from a rope of liquid-filled gum material comprising:

a chain-type tablet-forming mechanism, said tablet-forming mechanism comprising a first rotating chain mechanism having a first plurality of open die groove members thereon and a second rotating chain mechanism having a second plurality of open die groove members thereon, said first and second plurality of open die groove members forming closed die cavities for cutting said rope of gum material and forming individual pellets of liquid-filled gum material;

said open die groove members having curved and non-flat configurations wherein said formed individual pellets of liquid-filled gum material have curved non-flat exterior configurations.

12. The apparatus as set forth in claim 11 further comprising a rope sizing mechanism for forming and sizing the rope of gum material prior to being introduced into the tablet-forming mechanism.

* * * * *